(12) United States Patent
Grutzeck et al.

(10) Patent No.: US 12,493,179 B2
(45) Date of Patent: Dec. 9, 2025

(54) MICROMECHANICAL OSCILLATION SYSTEM

(71) Applicant: Robert Bosch GmbH, Stuttgart (DE)

(72) Inventors: Helmut Grutzeck, Kusterdingen (DE); Frank Schatz, Kornwestheim (DE); Johannes Baader, Haslach (DE); Josip Mihaljevic, Holzgerlingen (DE); Timo Schary, Aichtal-Neuenhaus (DE)

(73) Assignee: ROBERT BOSCH GMBH, Stuttgart (DE)

( * ) Notice: Subject to any disclaimer, the term of this patent is extended or adjusted under 35 U.S.C. 154(b) by 766 days.

(21) Appl. No.: 17/645,541

(22) Filed: Dec. 22, 2021

(65) Prior Publication Data

US 2022/0214536 A1 Jul. 7, 2022

(30) Foreign Application Priority Data

Jan. 5, 2021 (DE) .................. 10 2021 200 018.5

(51) Int. Cl.
*G02B 26/08* (2006.01)
*G03B 21/00* (2006.01)
*H01F 7/08* (2006.01)

(52) U.S. Cl.
CPC ......... *G02B 26/085* (2013.01); *G03B 21/008* (2013.01); *H01F 7/081* (2013.01)

(58) Field of Classification Search
CPC ...... G02B 26/085; G03B 21/008; H01F 7/081
USPC .................................................. 359/199.3
See application file for complete search history.

(56) References Cited

U.S. PATENT DOCUMENTS

| | | | | |
|---|---|---|---|---|
| 9,819,253 | B2* | 11/2017 | Gamet | H02K 33/18 |
| 11,114,929 | B2* | 9/2021 | Gamet | H02K 33/18 |
| 2007/0296532 | A1* | 12/2007 | Ko | B81B 3/0062 |
| | | | | 335/219 |
| 2008/0197951 | A1* | 8/2008 | Yang | H01F 7/0289 |
| | | | | 335/306 |
| 2010/0046054 | A1* | 2/2010 | Jeong | G02B 26/105 |
| | | | | 359/200.7 |
| 2014/0185117 | A1* | 7/2014 | Hino | G02B 26/085 |
| | | | | 359/199.3 |
| 2016/0124214 | A1* | 5/2016 | Freedman | G02B 26/105 |
| | | | | 438/3 |
| 2016/0231557 | A1* | 8/2016 | Lemaire | G02B 7/008 |
| 2017/0288479 | A1* | 10/2017 | Matyuch | H02K 15/12 |
| 2018/0252912 | A1* | 9/2018 | Steuer | G02B 26/101 |
| 2019/0146210 | A1* | 5/2019 | Maier | B81B 3/00 |
| | | | | 359/200.8 |
| 2020/0381156 | A1* | 12/2020 | Duan | H01F 7/1615 |
| 2022/0283427 | A1* | 9/2022 | Tanguep Njiokep | |
| | | | | G02B 26/101 |
| 2023/0375824 | A1* | 11/2023 | Schatz | G02B 26/085 |

\* cited by examiner

*Primary Examiner* — Bumsuk Won
*Assistant Examiner* — Seth D Moser
(74) *Attorney, Agent, or Firm* — NORTON ROSE FULBRIGHT US LLP

(57) ABSTRACT

A micromechanical oscillation system. The micromechanical oscillation system has a micromechanical oscillating body having at least one micromirror. In addition, the micromechanical oscillation system includes an electromagnetic drive unit which has a coil body and at least one magnet. The coil body essentially extends laterally to the micromirror. The at least one magnet extends underneath the coil body.

9 Claims, 3 Drawing Sheets

MICROMECHANICAL OSCILLATION SYSTEM

CROSS REFERENCE

The present application claims the benefit under 35 U.S.C. § 119 of German Patent Application No. DE 102021200018.5 filed on Jan. 5, 2021, which is expressly incorporated herein by reference in its entirety.

FIELD

The present invention relates to a micromechanical oscillation system, in particular a micromirror array, and to a micro-projection device having a micromechanical oscillation system.

BACKGROUND INFORMATION

U.S. Patent Application Publication No. US 2014/0185117 A1 shows a micromirror array in which two magnets as an electromagnetic drive unit of the micromirror array are situated laterally to a coil.

Starting from this, the present invention is based on the object of developing an alternative electromagnetic drive unit for a micromechanical oscillation system, in which the installation of the at least one magnet is simplified, in particular.

SUMMARY

To achieve the object, a micromechanical oscillation system is provided, in particular a micromirror array, and a micro-projection device having a micromechanical oscillation system, in accordance with the present invention.

In accordance with an example embodiment of the present invention, the micromechanical oscillation system, which particularly is developed as a micromirror array, includes a micromechanical oscillating body having at least one micromirror. In this context, the micromirror is particularly developed to execute a one-dimensional or two-dimensional rotation about a first and/or a second axis of rotation. The micromechanical oscillation system additionally is provided with an electromagnetic drive unit for this rotation of the micromirror, which includes a coil body and at least one magnet. The coil body in essence extends laterally to the micromirror, in particular laterally in a top view in the direction of an axis of symmetry of the micromirror. An axis of symmetry of the micromirror particularly refers to an axis that runs perpendicular through a first main extension plane of the micromirror and through a center point of the micromirror. Because the coil body essentially extends laterally to the micromirror and thus frames the micromirror, barely any insulation layers and/or conductive layers for the coil body have to be provided underneath the micromirror. Such insulation layers and/or conductive layers may lead to residual stresses and undesired warping of the micromirror. The magnet of the electromagnetic drive unit extends underneath the coil body, in particular underneath in a top view in the direction of the axis of symmetry of the micromirror. The coil body preferably extends entirely laterally to the micromirror, in particular laterally in a top view in the direction of the axis of symmetry of the micromirror. As a result, no insulation layers and/or conductive layers, which may lead to undesired warping of the micromirror, are required underneath the micromirror.

In addition, in accordance with an example embodiment of the present invention, the micromechanical oscillation system preferably includes a coil carrier for carrying the coil body. The coil carrier extends in a shared first main extension plane with the micromirror. The coil carrier preferably also extends laterally to the micromirror and thus surrounds the micromirror. Preferably, the coil body extends in a second main extension plane and the magnet extends in a third main extension plane. The first, second and third main extension planes are situated in parallel with one another.

The magnet is preferably situated relative to the coil body in such a way that the coil body is essentially situated within a stray field of magnetic field lines of the magnet disposed perpendicular to a main field. This makes it possible to place the magnet on the rear side of the coil. The stray field then preferably extends perpendicular to the axis of rotation and in the second main extension plane of the coil body.

The micromirror is preferably developed as a silicon component. The development as a silicon component makes it possible to give the micromirror the thinnest possible development. The coil carrier and/or the springs of the micromechanical oscillating body is/are preferably developed as silicon components as well. The complete micromechanical oscillating body then preferably extends in a shared main extension plane. In this context, the complete micromechanical oscillating body is preferably developed in one part as a silicon component.

In accordance with an example embodiment of the present invention, the electromagnetic drive unit preferably has at least two magnets, which are situated at a distance from each other. In addition, at least one first and one second magnetic flux guide for conducting the magnetic field lines in the direction of the coil body are situated between the magnets. Magnetically soft steel is preferably used for such magnetic flux guides. The magnetic flux guides are preferably curved and at least partially shield the magnets from an external environment. The magnetic flux guides focus the magnetic field on the outer coil windings and in general increase the magnetic field. As an alternative, the magnet of the electromagnetic drive unit has a first magnetization direction and a second magnetization direction that runs counter to the first magnetization direction. These different magnetization directions may be realized either by a suitable magnetization device or, alternatively, by joining two separate, previously magnetized magnets featuring an opposite magnetization direction. The above-mentioned magnetization device preferably refers to magnetically soft sheet metals that align the magnetic field in opposite directions during the magnetization or, alternatively, to miniaturized superconductive coils, which correspondingly magnetize the two magnets in opposite directions. Here, too, the micromechanical oscillation system additionally has at least one third magnetic flux guide for conducting the magnetic field lines in the direction of the coil body. In this case as well, magnetically soft sheet metal is preferably used for such a magnetic flux guide. The third magnetic flux guide is preferably curved and at least partially shields the magnet from an external environment. In a further alternative, the magnet of the electromagnetic drive unit preferably has a main magnetic field whose magnetic field lines in essence extend in parallel with a second main extension plane of the coil body. In other words, the magnet is situated underneath the coil rotated by 90°. In this context, the micromechanical oscillation system additionally includes at least one fourth and one fifth magnetic flux guide for conducting the magnetic field lines in the direction of the coil body. The fourth and fifth magnetic flux guides preferably rest flat against an outer side of the magnet. A further, sixth magnetic flux guide is preferably provided for conducting the magnetic field lines in the direction of the coil body. This sixth magnetic flux guide preferably rests flat against a topside of the magnet.

A further subject matter of the present invention is a micro-projection device provided with the previously described micromechanical oscillation system. In such a micro-projection device, the micromirror is used to project light that a laser unit, for instance, radiates onto the micromirror, onto a screen.

DETAILED DESCRIPTION OF EXAMPLE EMBODIMENTS

Figure 1A:
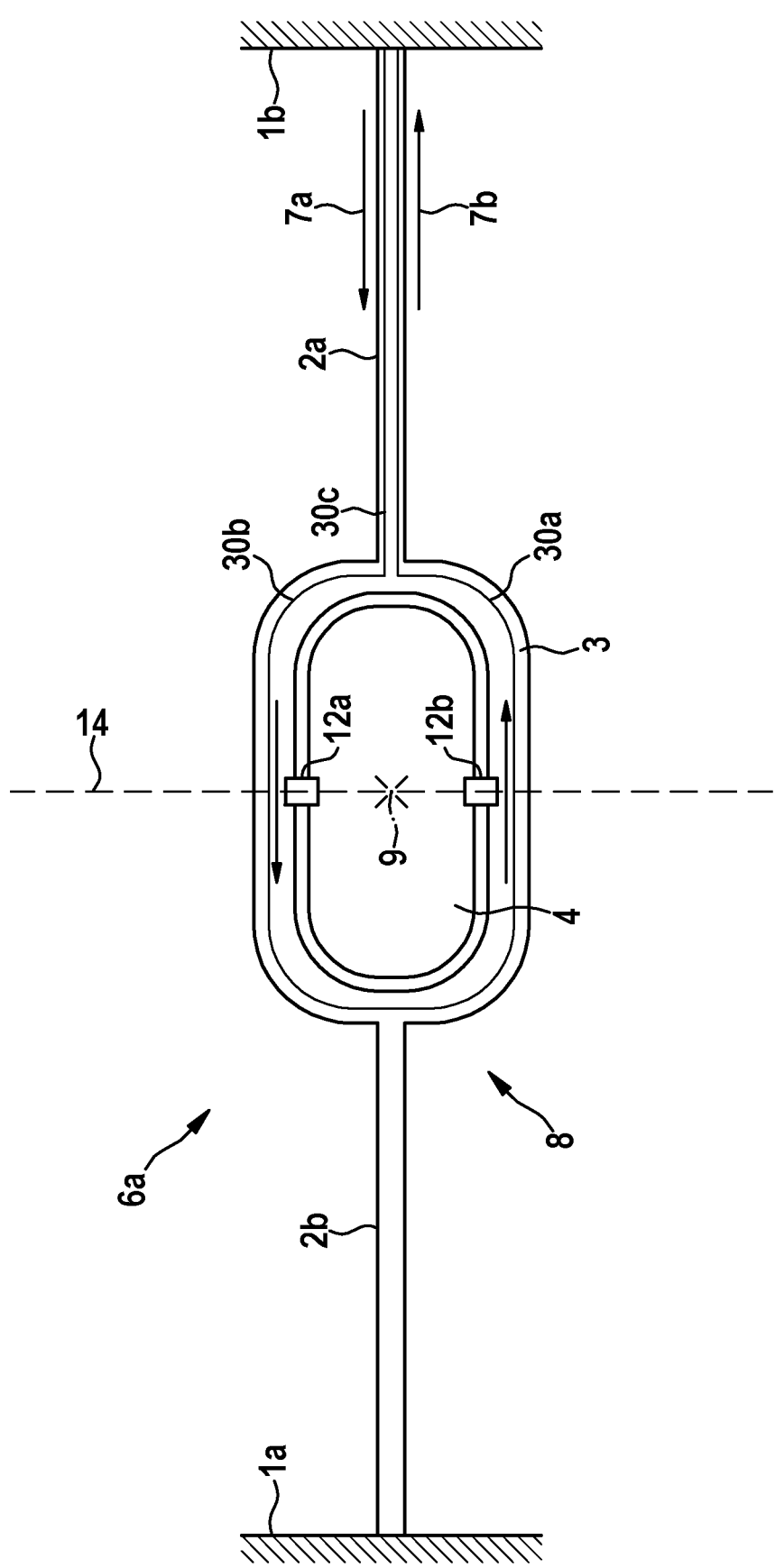
FIG. 1A shows a top view of a first embodiment of a micromechanical oscillation system, in accordance with the present invention.

FIG. 1A schematically shows a top view of a first embodiment of a micromechanical oscillation system 6a. The top view here denotes a view that runs in the direction of an axis of symmetry 9 or the center axis of micromirror 4. Micromechanical oscillation system 6a includes a micromechanical oscillating body 8 having micromirror 4. In addition, micromechanical oscillation system 6a has an electromagnetic drive unit whose coil body 30a, 30b together with supply line 30c is shown here. Coil body 30a and 30b extends completely laterally to micromirror 4 and thus frames it. The current direction within the coil body is indicated by arrows 7a and 7b.

Micromechanical oscillation system 6a furthermore includes a coil carrier 3 for carrying coil body 30a, 30b and its supply line 30c. Coil carrier 3 in turn is connected to micromirror 4 with the aid of two first springs 12a and 12b which extend in a straight line. The micromechanical oscillation system also includes two springs 2a and 2b that extend in a straight line and fasten micromechanical oscillating body 8 to a frame part 1a and 1b. Supply line 30c for the electrical contacting runs on a surface along second spring 2b. Springs 2a and 2b extending in a straight line may alternatively also be replaced by meandering spring forms in order to reduce the required space or to change frequency characteristics, for example.

In this embodiment, complete micromechanical oscillating body 8 having micromirror 4 is developed in one part as a silicon component.

Figure 1B:
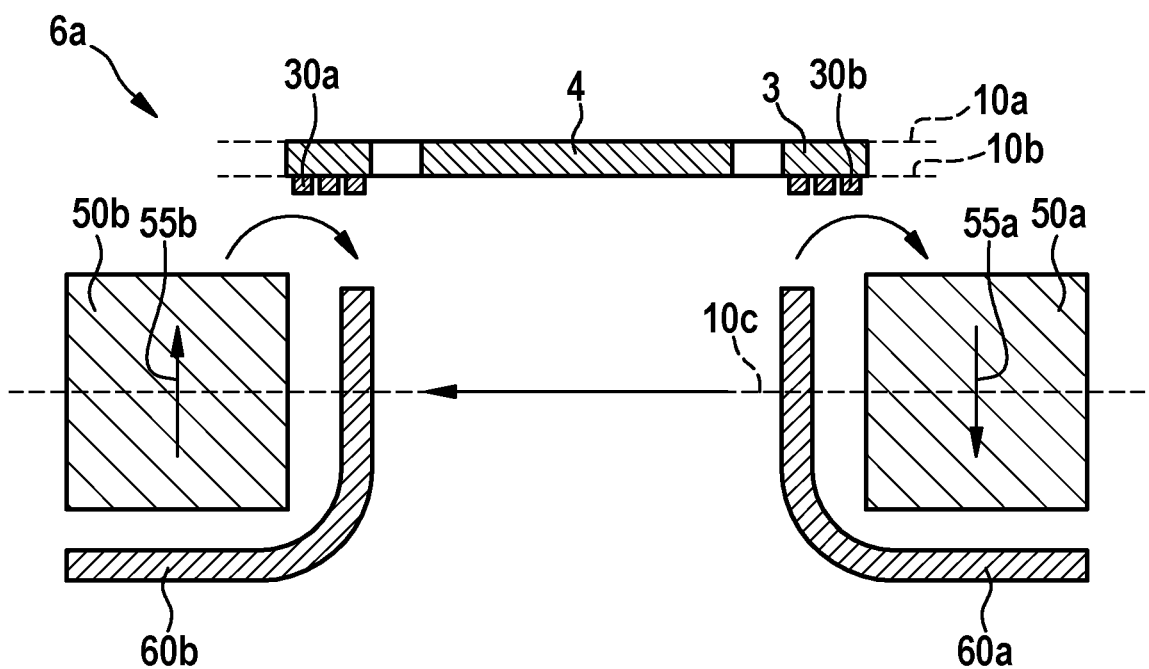
FIG. 1B shows a cross-section of the first embodiment of the micromechanical oscillation system, in accordance with the present invention.

FIG. 1b schematically shows the first embodiment of micromechanical oscillation system 6a in a cross-section along plane 14 in FIG. 1A. Here, a first magnet 50a and a second magnet 50b of the electromagnetic drive unit of micromechanical oscillation system 6a can be seen. The two magnets 50a and 50b extend underneath coil body 30a and 30b. The two magnets 40a and 50b are situated relative to coil body 30a and 30b in such a way that coil body 30a and 30b in essence is situated within a stray field 55a and 55b of magnetic field lines of respective magnet 50a and 50b which lies perpendicular to a main field. Magnets 50a and 50b are set apart from each other. A first magnetic flux guide 60a and a second magnetic flux guide 60b for conducting the magnetic field lines in the direction of coil body 30a and 30b are situated between magnets 50a and 50b. Magnetic flux guides 60a and 60b have a curved development and at least partially shield the respective magnet 50a and 50b from an external environment. In addition, magnetic flux guides 60a and 60b amplify the magnetic field in the coil region.

Coil carrier 3 extends in a shared first main extension plane 10a with micromirror 4. Coil body 30a and 30b attached to coil carrier 3 extends in a second main extension plane 10b in parallel with first main extension plane 10a. Magnets 50a and 50b in turn extend in a third main extension plane 10c which in turn is situated in parallel with first main extension plane 10a and second main extension plane 10b.

Figure 2:
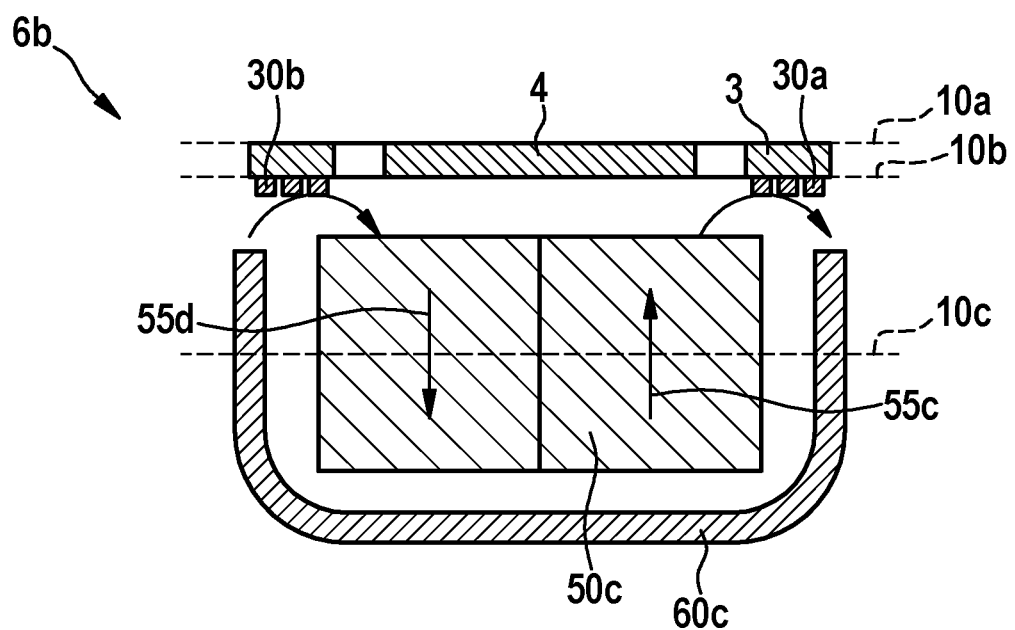
FIG. 2 shows a cross-section of a second embodiment of the micromechanical oscillation system, in accordance with the present invention.

FIG. 2 shows a second embodiment of a micromechanical oscillation system 6b in a cross-section that extends along the same plane 14 as in FIG. 1B. In contrast to the first embodiment, only a single third magnet 50c is situated underneath coil body 30a and 30b. Third magnet 50c has a first magnetization direction 55c and a second magnetization direction 55d that runs counter to first magnetization direction 55c. In addition, micromechanical oscillation system 6b has a third, curved magnetic flux guide 60 for conducting the magnetic field lines in the direction of coil body 30a and 30b. Third magnetic flux guide 60c at least partially shields third magnet 50c from an external environment.

Figure 3:
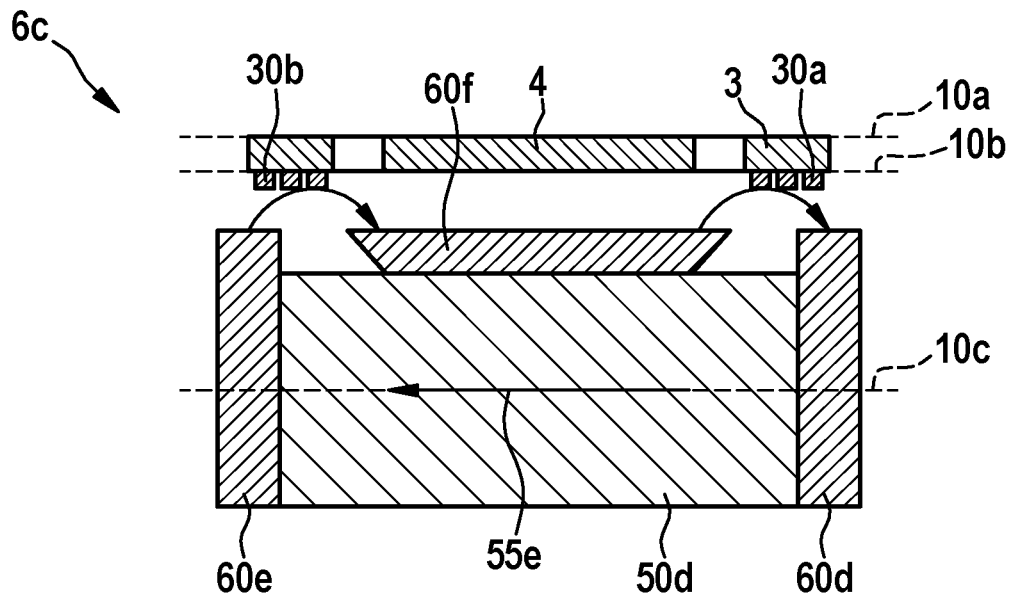
FIG. 3 shows a cross-section of a third embodiment of the micromechanical oscillation system, in accordance with the present invention.

FIG. 3 shows a third embodiment of a micromechanical oscillation system 6c in a cross-section that extends along the same plane 14 as in FIG. 1B. Here, too, as in FIG. 2, only a single, fourth magnet 50d is situated underneath coil body 30a and 30b. Magnetic field lines 55e of the main magnetic field of the fourth magnet in essence extend in parallel with second main extension plane 10b of coil body 30a and 30b. Accordingly, fourth magnet 50d is situated at an angle, rotated by 180°, underneath coil body 30a and 30b. Micromechanical oscillation system 6c additionally has a fourth magnetic flux guide 60d and a fifth magnetic flux guide 60e for conducting magnetic field lines 55e in the direction of coil body 30a and 30b. Fourth magnetic flux guide 60d and fifth magnetic flux guide 60e lie flat against an outer side of fourth magnet 50d. In addition, micromechanical oscillation system 6c has a further, sixth magnetic flux guide 60f for conducting magnetic field lines 55e in the direction of coil body 30a and 30b. This sixth magnetic flux guide 60f rests flat against a topside of fourth magnet 50d.

Figure 4:
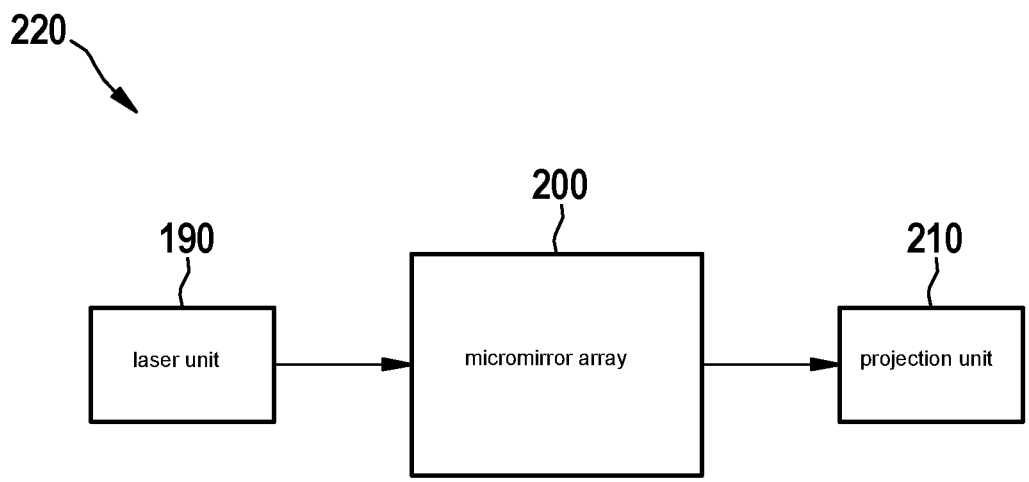
FIG. 4 schematically shows a micro-projection device provided with a micromechanical oscillation system, in accordance with an example embodiment of the present invention.

FIG. 4 schematically shows by way of example a micro-projection device 220 provided with a micromirror array 200 as a micromechanical oscillation system. In addition to micromirror array 200, such a micro-projection device has a laser unit 190, which is designed to radiate light of at least one wavelength onto micromirror array 200. Micromirror array 200 in turn is designed to deflect the light of at least one wavelength onto a projection unit 210 as a function of a deflection of the micromirror of micromirror array 200.

What is claimed is:

1. A micromechanical oscillation system, comprising:
a micromechanical oscillating body having at least one micromirror; and
an electromagnetic drive unit including a coil body and at least two magnets, the coil body extending completely laterally to the micromirror, the coil body extending laterally in a top view in a direction of an axis of symmetry of the micromirror, and the at least two magnets extending underneath the coil body, the at least two magnets extending underneath in the top view in the direction of the axis of symmetry of the micromirror, wherein the at least two magnets are situated at a distance from each other, and at least one first and one second magnetic flux guide for conducting the magnetic field lines in a direction of the coil body are situated between the at least two magnets, wherein the at least one first and one second magnetic flux guides are curved and at least partially shield the at least two magnets from an external environment.

2. The micromechanical oscillation system as recited in claim 1, wherein the micromechanical oscillation system is a micromirror array.

3. The micromechanical oscillation system as recited in claim 1, wherein the coil body extends entirely laterally to the micromirror, the coil body extending entirely laterally in the top view in the direction of the axis of symmetry of the micromirror.

4. The micromechanical oscillation system as recited in claim 1, wherein the micromechanical oscillation system additionally includes a coil carrier for carrying the coil body, and the coil carrier extends in a shared first main extension plane with the micromirror.

5. The micromechanical oscillation system as recited claim 1, wherein the magnet is situated relative to the coil body in such a way that the coil body is situated within a stray field of magnetic field lines of the magnet disposed perpendicular to a main field.

6. The micromechanical oscillation system as recited in claim 1, wherein the micromirror is a silicon component.

7. The micromechanical oscillation system as recited in claim 1, wherein the at least two magnets of the electromagnetic drive unit has a first magnetization direction and a second magnetization direction that runs counter to the first magnetization direction, and the micromechanical oscillation system additionally has at least one third magnetic flux guide for conducting the magnetic field lines in the direction of the coil body.

8. The micromechanical oscillation system as recited in claim 7, wherein the magnet of the electromagnetic drive unit has a main magnetic field, and the magnetic field lines of the main magnetic field extend in parallel with a second main extension plane of the coil body, and the micromechanical oscillation system additionally includes at least one fourth and one fifth magnetic flux guide for conducting the magnetic field lines in the direction of the coil body.

9. A micro-projection device, comprising:
a micromechanical oscillation system including:
a micromechanical oscillating body having at least one micromirror; and
an electromagnetic drive unit including a coil body and at least two magnets, the coil body completely extending laterally to the micromirror, the coil body extending laterally in a top view in a direction of an axis of symmetry of the micromirror, and the at least two magnets extending underneath the coil body, the at least one magnet extending underneath in the top view in the direction of the axis of symmetry of the micromirror, the at least two magnets being situated at a distance from each other, and at least one first and one second magnetic flux guide for conducting the magnetic field lines in a direction of the coil body being situated between the at least two magnets, wherein the at least one first and one second magnetic flux guides are curved and at least partially shield the at least two magnets from an external environment.

\* \* \* \* \*